Jan. 16, 1934.  G. A. BELL  1,943,718
FUEL INJECTION DEVICE FOR INTERNAL COMBUSTION ENGINES
Filed Nov. 29, 1929  3 Sheets-Sheet 1
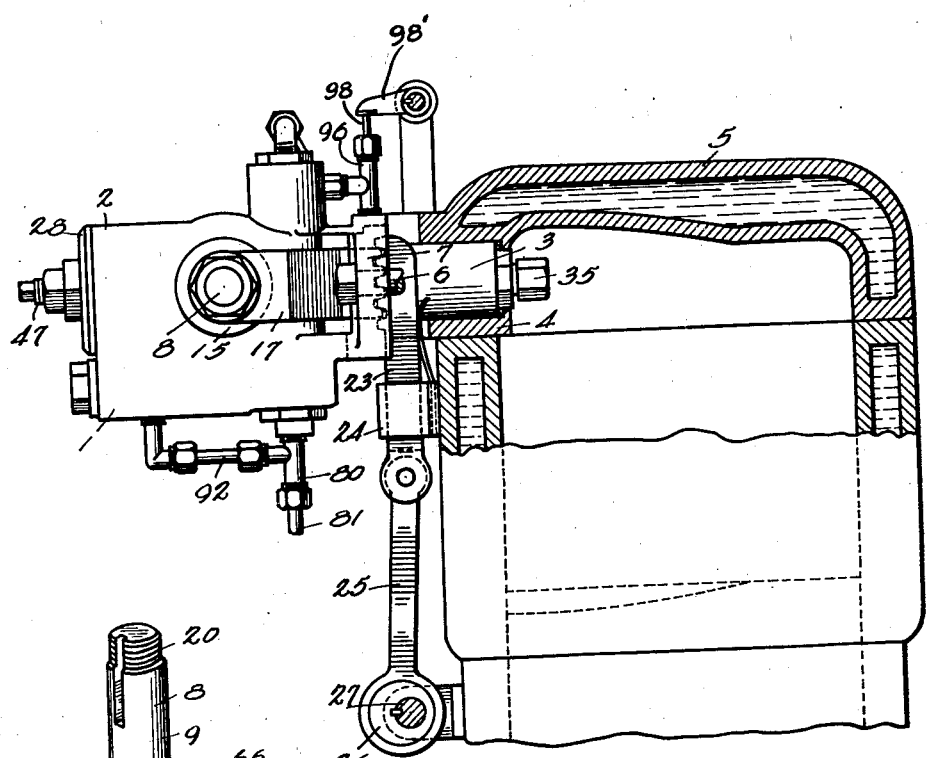
Fig. 1.
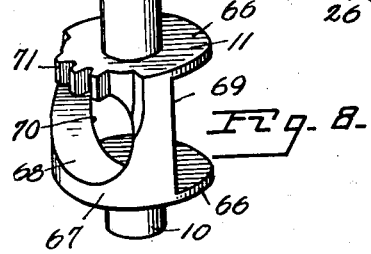
Fig. 8.
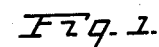
Fig. 9.  Fig. 10.  Fig. 11.
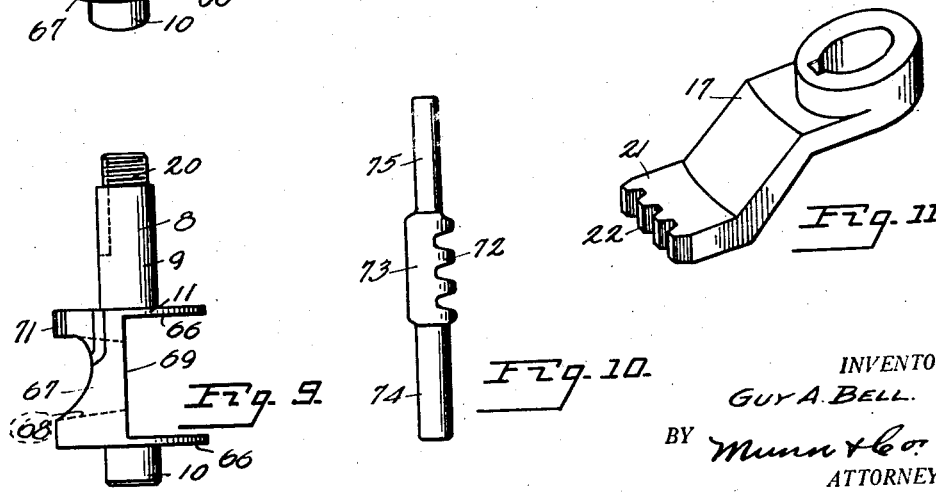
INVENTOR.
GUY A. BELL.
BY Munn & Co.
ATTORNEYS.

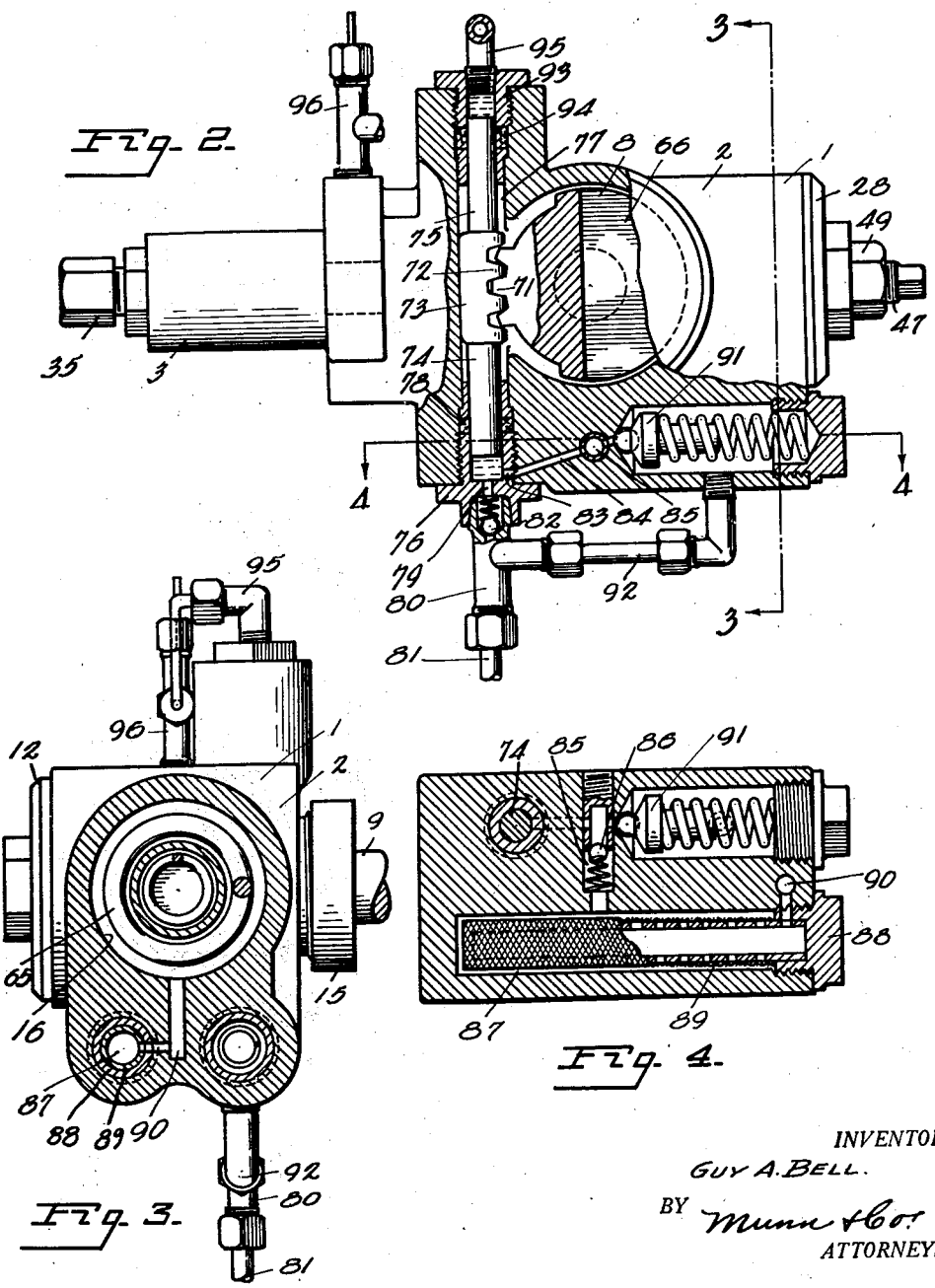

Jan. 16, 1934. G. A. BELL 1,943,718
FUEL INJECTION DEVICE FOR INTERNAL COMBUSTION ENGINES
Filed Nov. 29, 1929 3 Sheets-Sheet 3
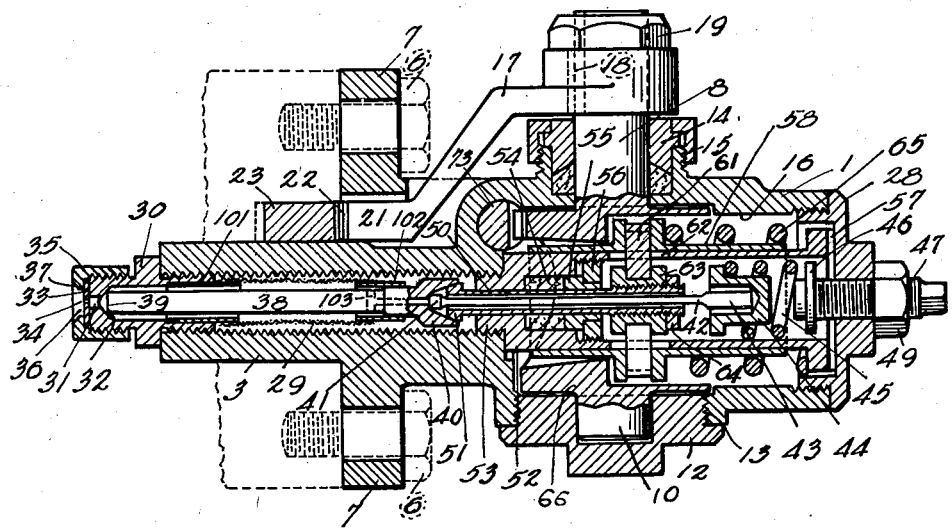
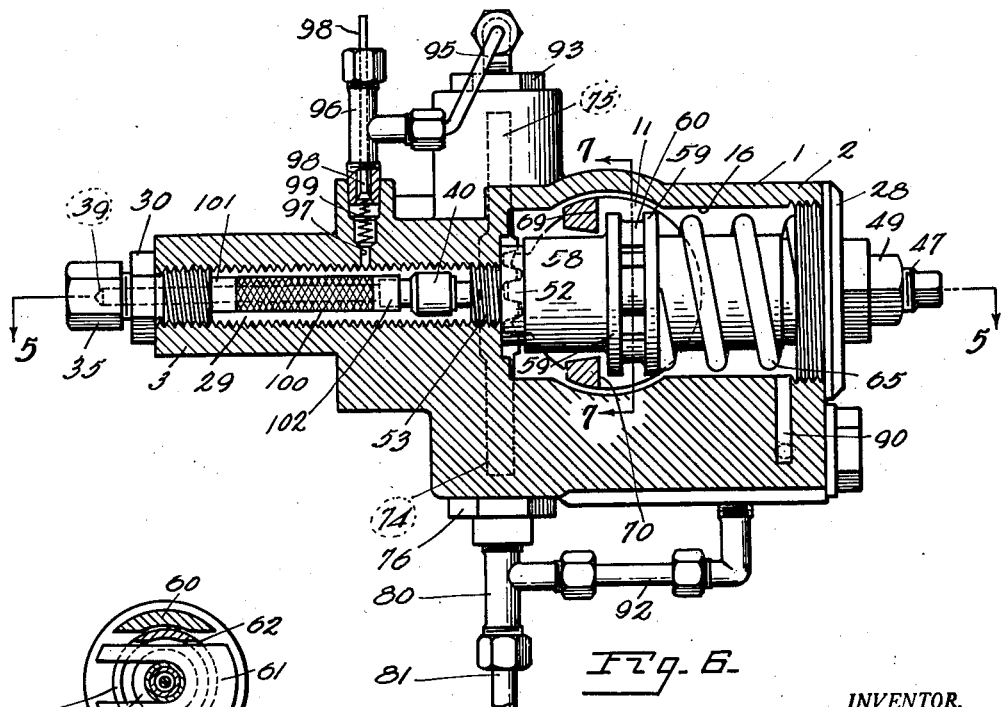
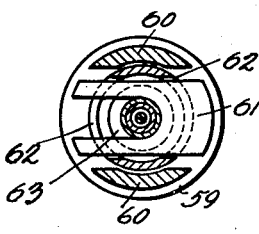
INVENTOR.
GUY A. BELL
BY Munn & Co
ATTORNEYS.

Patented Jan. 16, 1934

1,943,718

UNITED STATES PATENT OFFICE 1,943,718

FUEL INJECTION DEVICE FOR INTERNAL COMBUSTION ENGINES

Guy A. Bell, Burlingame, Calif.

Application November 29, 1929
Serial No. 410,514

19 Claims. (Cl. 299—107.2)

The present invention relates to improvements in fuel injection devices for internal combustion engines, and has particular reference to engines of the Diesel type in which a spray of atomized oil is forced into the cylinder of the engine against high pressure.

The principal object of the present invention is to provide a fuel injecting device of the character described that is simple in construction, combines various features into a single unit and performs its function with great efficiency.

A further object of the invention is to combine a fuel injecting nozzle and pumping means for forcing fuel therethrough under pressure into a single unit that may be removably fastened to the engine block or engine head in such a manner that one unit may be quickly replaced by another unit by the mere loosening and tightening of a few bolts and without affecting the remainder of the engine.

A further object of the invention is to provide a fuel injecting device of the solid injection type in which fuel is injected into the combustion chamber of an internal combustion engine without the aid of an air blast and under high pressure; a further object of the invention is to provide a fuel injecting device in which the injection period is sharply defined, and in which particularly the cutting off of the injection takes place automatically and instantaneously as soon as the injection pressure drops below a certain degree whereby "dribbling" of the fuel into the combustion chamber is effectively prevented; a further object of the invention is to provide an injection device in which the injection period is shortened considerably as compared with methods used at the present time, and in which the injection period remains substantially constant for varying loads and varying speeds, and in which the quantity of fuel injected is made to vary in accordance with speed and load requirements; a further object of the invention is to produce a particularly efficient combination and arrangement of the various parts entering into the fuel injecting device.

Further objects and advantages of my invention will appear as the specification proceeds.

The preferred form of my invention is illustrated in the accompanying drawings in which Figure 1 shows a side elevation of my fuel injecting device as applied to an internal combustion engine, the latter being partly shown in section;

Figure 2 a side elevation of the same device looking at it from the opposite side and partly shown in section;

Figure 3 a vertical section taken along line 3—3 of Figure 2;

Figure 4 a horizontal section taken along line 4—4 of Figure 2;

Figure 5 a central horizontal section taken along line 5—5 of Figure 6;

Figure 6 a central vertical section;

Figure 7 a transverse vertical section taken along line 7—7 of Figure 6;

Figure 8 a perspective detail view of a rocking member used in my device;

Figure 9 a side view thereof;

Figure 10 a side elevation of a plunger used in my device; and

Figure 11 a perspective view of an operating arm forming part of my invention.

While I have shown only the preferred form of the invention, I wish to have it understood that various changes or modifications may be made within the scope of the claims hereto attached without departing from the spirit of the invention.

In its preferred form my invention comprises a casting 1, including a substantially rectangular block 2, having a tubular member 3 extending therefrom, which latter is adapted for introduction into the side wall 4 of an engine head 5. The casting may be fastened to the engine head in any suitable manner as for instance, by means of bolts 6 passing through flanges 7 into the material of the engine head. Transversely of the block there is supported the rocking member 8 shown in detail in Figure 8, and comprising two pieces 9 and 10 of a shaft connected by an intervening cage 11. The short end 10 of the shaft is journaled in a plug 12 threaded into the block as shown at 13, and the longer end 9 is journaled in a packing gland 14 held in place by means of a cap 15, while the cage occupies part of a large, substantially cylindrical chamber 16 within the casting, hereinafter called the low pressure chamber. The end 9 of the shaft 8 extends beyond the gland 14 and has an arm 17 keyed thereto as shown at 18, the arm being held in place by a nut 19 threaded on the reduced end 20 of the shaft 8. The arm 17 is shown in perspective view in Figure 11 and has a free end 21 offset from its joint, the free end terminating in a number of teeth 22 adapted for engagement with a rack rod 23 slidably supported in a bearing 24 extending from the engine block, and made to reciprocate by means of a connecting link 25 mounted on an eccentric 26, which latter is keyed to a horizontal shaft 27 geared or otherwise connected to the crank shaft so as to revolve at the speed of the crank shaft in a two cycle engine or at half the speed in a four cycle engine. It will be noted that in this manner the cage 11 is rocked back and forth as the engine piston moves up and down.

The low pressure chamber 16 previously mentioned is closed at its rear end by means of a cap 28 and is axially aligned with the high pressure chamber 29 extending through the tubular member 3 previously mentioned. Into the front end of the latter there is threaded a plug 30 having a central aperture 31 and a tapered valve seat 32 adjacent the same. A disc 33 with an extremely fine port hole 34 is placed over the end of the plug and held to the same by a cap 35 formed with a large central opening 36 and a flaring wall 37 defining the opening.

A needle 38 extends centrally through the high pressure chamber and is provided with a tapered point 39 adapted to engage with the tapered seat 32 and terminating at its rear end in a cup shaped enlargement 40 adapted to receive in the cavity thereof the button 41 of a pin 42, the enlarged rear end 43 of which is received in a cup 44 pressed upon by a spring 45, one end of which bears against a disc 46 forming part of a screw 47 threaded into the cap 28 and held in adjusted position by means of a nut 49. The tension of the spring 45 may be adjusted by setting the screw 47.

The pin 42 is encircled by a sleeve 50 having a tapered head 51 adapted to seat in the cup 40 and slidably supported in a cylindrical member 52 extending throughout the length of the low pressure chamber, and having a reduced neck 53 threaded into the high pressure chamber. Suitable packing 54 is held in place around the sleeve 50 by means of a gland 55 and a nut 56. The cylindrical member 52 is formed with grooves 57 at the rear end so as to allow oil to freely pass around the rear end to the inside of the chamber.

Slidably mounted on the cylindrical body 52 there is a large sleeve 58 formed in its central portion with two opposing collars 59 spaced by small bridging members 60 which leave sufficient space to allow of the introduction between the collars of a forked member 61, passing through slots 62 in the cylindrical body 52 into straddling engagement with a grooved collar 63 threaded on the sleeve 50 and held in adjusted position by a nut 64. A spring 65, considerably stronger than the spring 45 previously mentioned, bears against the outer collar 59 for urging the sleeve 58 and thereby the small sleeve 50 forward.

The cage 11 previously mentioned comprises two spaced discs 66 and a semi-cylindrical connecting piece 67 and is mounted relative to the sleeve 58 so that the front portion of the latter extends through a large aperture 68 in the semi-cylindrical portion of the cage, and that the two shoulders 69 and 70 formed by the semi-cylindrical portion are adapted to bear against the forward collar 59 either above or below the sleeve 58 when the cage is rocked in the manner previously described.

The semi-cylindrical portion 67 of the cage is provided at one end with a plurality of teeth 71, which mesh with the teeth 72 of the plunger 73 extending vertically through the casting and presenting a heavy lower end 74 and a lighter upper end 75. The lower end of the plunger is intended for pumping oil from a suitable supply into the low pressure chamber while the upper end is intended for pumping oil from and into the high pressure chamber. The lower end of the plunger reciprocates in a plug 76 threaded into the bottom end of a vertical bore 77, suitable packing being provided as shown at 78. The plug 76 connects through an aperture 79 with a joint 80 leading through a pipe 81 to a source of supply, and provided with a check valve as shown at 82. The plug 76 connects through a port 83 with a passage 84, which latter communicates through a transverse passage 85, and a check valve 86 with a chamber 87. The latter is closed by a cap 88 which has a sleeve-shaped strainer 89 extending into the chamber, the inside of the strainer communicating through a passage 90 with the low pressure chamber 16 previously referred to. While the oil is pumped into the low pressure chamber, it passes a spring pressed valve 91 which recedes when the pressure exceeds a predetermined degree, and by-passes excess fuel back into the source of supply through the pipe 92. It will be seen that in this manner the pressure within the low pressure chamber may be held at a predetermined degree, which is preferably set to exceed the normal maximum pressure existing within the combustion chamber of the engine by about one hundred pounds.

The upper end of the plunger operates in a plug 93 and is suitably packed as at 94. The plug connects through piping 95 with a fitting 96 threaded into the casting for communication with the high pressure chamber as at 97. A valve 98 within the fitting is normally seated by a spring 99 and may be operated manually or by governor control through the rocker arm 98' bearing on its stem 98''.

Within the high pressure chamber I provide a straining means comprising a cylindrical strainer 100 encircling the needle 38 and fastened at opposite ends to the sleeves 101 and 102, the former being fixed to the inside of the plug 30 and the latter being slidable on the head 40 of the needle. Near its rear end the needle is formed with a port 103 leading to the cavity in the head 40 and normally covered by the button 41 of the pin 42.

The operation of my device may be described as follows:

The connecting link 25 reciprocates the rack rod 23 to correspond with the movements of the piston in the engine where the latter operates on the two cycle principle. The rack rod, through the arm 17, causes the cage 11 to rock back and forth, and the cage performs two functions: it operates the plunger 73 and also the sleeve 58, and through the latter, the smaller sleeve 50. The cycle of operations then is as follows:

1st: On the downward stroke of the plunger:

a. The lower end of the piston forces the charge sucked in on the previous upward movement through the passage 84, the check valve 86, the strainer 89, and the passage 90 into the low pressure chamber, the pressure communicating itself past the rear end of the cylindrical member 52 to the fuel contained within the said member and within the sleeve 50. The pressure in this low pressure chamber is limited to a desired maximum by the spring loaded by-pass valve 91 which allows excess fuel oil to return to the line.

b. The upper end of the plunger, assuming valve 98 to be open, draws in a charge through the fitting 96 and the piping 95 thereby lowering the pressure in the high pressure chamber. The amount of fuel oil drawn in is regulated by the valve 98 which thus serves as a throttle and which may be operated either manually or by means of a governor, or both manually and automatically.

c. The lower shoulder 70 of the cage strikes the collar 59 of the sleeve 58, and causes the same to retract, this motion being transmitted to the sleeve 50 through the forked member 61, and the grooved collar 63. It will be noted that at this time the pressure in the high pressure chamber is comparatively low and is not sufficient to overcome the resistance of the spring 45 which, through the pin 42, urges the needle 38 upon its seat at the front of the nozzle so that the sleeve 50, in retracting, separates from the needle 38 and allows fuel oil to enter from the low pressure chamber into the high pressure chamber through the clearance between the cup shaped head 40 of the needle and the head 51 of the sleeve 50. As the cage rocks back into neutral position, the spring 65 forces the sleeve 50 back upon its seat in the cup shaped head 40 of the needle 38.

2nd: On the upward stroke of the plunger:

a. The charge drawn in by the upper end of the plunger on the previous stroke is forced back into the high compression chamber 29 increasing the pressure therein to a predetermined degree, for instance, five thousand pounds. If the fuel forced into the high pressure chamber tends to increase the pressure above five thousand pounds, the excess oil escapes through the port 103, the pressure being sufficiently strong to lift the button 41 of the pin 42 from its seat so as to let part of the fuel oil escape to the low pressure chamber. It should be understood that the pressure within the high pressure chamber does not necessarily reach the maximum of five thousand pounds or whatever maximum may be selected, since the pressure is controlled by the throttle valve 98. When the engine idles for instance, and the throttle valve is opened only slightly, the amount of fuel oil withdrawn on the downward stroke of the plunger and forced back on the upward stroke is not sufficient to increase the pressure to five thousand pounds, and as a consequence a smaller amount of fuel oil will be discharged into the combustion chamber of the engine. The pressure now bears against the enlarged head 40 of the needle and firmly holds the needle to the head 51 of the sleeve 50 to effect a perfect seal at that point.

b. The lower end of the plunger sucks in a new charge from the fuel supply which delivers fuel oil to the device at slight pressure.

c. The upper shoulder 69 of the cage retracts the sleeve 58 and through the latter the sleeve 50. At this time the high pressure within the chamber 29 firmly holds the cup shaped head 41 of the needle 38 to the head of the sleeve 50 and both the sleeve and the needle 38 retract as a unit, lifting the needle 38 from its seat at the front end of the nozzle and allowing the fuel oil to be sprayed into the combustion chamber of the engine. The discharge of fuel reduces the pressure within the high pressure chamber, and as soon as this pressure drops to a predetermined degree, say about two thousand pounds, the needle 38 snaps back upon its seat through the action of the spring 45 so that the closing of the nozzle takes place instantaneously, whereby any dribbling of fuel oil into the combustion chamber is prevented.

It should be understood that in my device the injection period is made very short and preferably extends only through a few degrees of the rotation period of the crank shaft, the injection preferably being adjusted to take place at the end of the compression upward stroke of the piston. It should also be noticed that in my device, the injection period remains substantially constant for varying engine speeds, while the amount of fuel injected during that period varies with the requirements of the engine since at full load the throttle valve 98 is fully opened for building up a maximum pressure in the high pressure chamber, while at light loads the valve is only partly opened and correspondingly less pressure is built up in the high pressure chamber.

I claim:

1. A nozzle for an engine of the character described comprising a high-pressure chamber having communication with the engine, a low-pressure chamber having communication with the high-pressure chamber, a valve for the first communication, a valve for the second communication coacting with the first valve in forming a seal between the two chambers, by-passing means for the seal having a spring pressed safety valve associated therewith, and means for retracting the second valve.

2. A valve mechanism of the character described, comprising a pressure chamber having a discharge port, a sleeve communicating therewith, means for retracting and advancing the sleeve, and a needle forming a valve for the discharge port and forming a second valve with the sleeve, the second valve being enlarged so as to allow pressure within the chamber to bear thereon for urging the same closed.

3. A nozzle for an internal combustion engine, comprising a pressure chamber for holding fuel having communication with the engine, a valve for the communication, means for withdrawing fuel from the pressure chamber and for simultaneously introducing a corresponding amount, adapted to reintroduce the withdrawn fuel oil, means for controlling the amount withdrawn and reintroduced for controlling the pressure within the chamber and an operating means for the valve.

4. A nozzle for an engine of the character described, comprising a chamber adapted to hold fuel under pressure and having a port leading into the engine, a needle valve for the port, a valve closing member adapted to seat in the rear end of the needle valve and having spring means for seating the same, pressure responsive means tending to seat the valve closing member, means for retracting the closing member allowing the pressure within the chamber to retract the needle valve for opening the port, and a second spring-actuated member active on the needle valve and arranged to close the same when the pressure drops below a predetermined degree.

5. A nozzle for an engine of the character described comprising a chamber adapted to hold fuel under pressure and having a port leading into the engine, a needle valve for the port, a sleeve adapted to seat with its front end in the rear end of the needle valve and having spring means for seating the same, pressure responsive means tending to seat the sleeve, means for retracting the sleeve allowing the pressure within the chamber to retract the needle valve for opening the port and a spring-actuated pin slidable in the sleeve and bearing on the end of the needle valve for closing the same when the pressure drops below a predetermined degree.

6. A nozzle for an engine of the character described comprising a chamber adapted to hold fuel under pressure and a port leading into the engine, a needle valve for the port, a sleeve adapted to seat with its front end in the rear end of the needle valve and having spring means for seating the same, pressure responsive means tending to seat the sleeve, means for retracting the sleeve allowing the pressure within the chamber to retract the needle valve for opening the port, and a spring-actuated pin slidable in the sleeve and bearing on the end of the needle valve for closing the same when the pressure drops below a predetermined degree, the needle valve having a relief port in its rear end normally covered by the pin but allowing an excess of pressure to unseat the pin.

7. A nozzle for an engine of the character described, comprising a chamber adapted to hold fuel under pressure and having a port leading into the engine, a needle valve for the port, a valve-closing member adapted to seat in the rear end of the needle valve and having spring means for seating the same, pressure responsive means for seating the valve closing member, means for retracting the closing member allowing the pressure within the chamber to retract the needle valve for opening the port, and means for increasing the pressure in the chamber simultaneously with the retracting of the closing member.

8. A nozzle for an engine of the character described, comprising a chamber adapted to hold fuel under pressure and having a port leading into the engine, a needle valve for the port, a sleeve adapted to seat with its front end in the rear end of the needle valve and having spring means for seating the same, pressure responsive means tending to seat the valve closing member, means for retracting the sleeve allowing the pressure within the chamber to retract the needle valve for opening the port, and means for increasing the pressure in the chamber simultaneously with the retracting of the sleeve.

9. A nozzle for an engine of the character described, comprising a chamber adapted to hold fuel under pressure and having a port leading into the engine, a needle valve for the port and a valve closing member adapted to seat in the rear end and having spring means for seating the same, pressure responsive means tending to seat the valve closing member, means for retracting the closing member allowing the pressure within the chamber to retract the needle valve for opening the port, a conduit leading to the chamber, a plunger active in said conduit and means for moving the plunger for increasing the pressure in the chamber simultaneously with the retracting of the valve closing member.

10. A nozzle for an engine of the character described comprising a high pressure chamber having a port leading into the engine, a needle valve for the port having an enlarged and cupped rear end, a low pressure chamber rearwardly of the high pressure chamber, a sleeve slidably mounted between the chambers and adapted to seat with its front end in the cupped rear end of the needle valve so as to form a second valve therewith and communicating with the low pressure chamber, spring means for normally seating the sleeve, means for retracting the sleeve whereby it becomes unseated for opening the second valve and means for simultaneously reducing the pressure in the high pressure chamber and for increasing the pressure in the low pressure chamber whereby fuel is made to enter through the second valve from the low pressure chamber into the high pressure chamber.

11. A nozzle for an engine of the character described comprising a high pressure chamber having a port leading into the engine, a needle valve for the port having an enlarged and cupped rear end, a low pressure chamber rearwardly of the high pressure chamber, a sleeve slidably mounted between the chambers and adapted to seat with its front end in the cupped rear end of the needle valve so as to form a second valve therewith and communicating with the low pressure chamber, spring means for normally seating the sleeve, means for retracting the sleeve whereby it becomes unseated for opening the second valve and means for simultaneously reducing the pressure in the high pressure chamber whereby fuel is made to enter through the second valve from the low pressure chamber into the high pressure chamber, the sleeve having a spring-pressed pin therein bearing on the needle valve for holding the needle valve to its seat and for assisting in breaking the seal between the needle valve and the sleeve.

12. A nozzle for an engine of the character described, comprising a chamber adapted to hold fuel under pressure and having a port leading into the engine, a needle valve for the port having an enlarged and cupped rear end, a spring-pressed pin bearing on the cupped end of the needle valve for normally closing the same, a spring-pressed sleeve encircling the pin and active on the rear end of the needle valve, a shoulder on said sleeve and a rocking member active on the shoulder for retracting the sleeve.

13. A fuel injecting device for an internal combustion engine, comprising a casting having a nozzle and a pump mechanism embodied therein, a valve in the nozzle, a slidable operating member for the valve, a plunger in the pumping mechanism having a plurality of teeth thereon, a collar on the operating member, a rocking member arranged to bear on the collar at opposite points for retracting the operating member on each rocking motion, and a plurality of teeth on the rocking member meshing with the plunger teeth for operating the latter in timed relation to the operation of the valve operating member.

14. In a fuel injecting nozzle for an internal combustion engine, a pressure fuel chamber having a port leading to the engine, a valve for said port, means for increasing the pressure in the chamber to a maximum, means for opening the valve at maximum pressure and a control valve for the pressure increasing means adapted to vary the maximum to correspond to load requirements.

15. In a fuel injecting nozzle for an internal combustion engine, a pressure fuel chamber having a port leading to the engine, a valve for said port, means for increasing the pressure in the chamber to a maximum, means for opening the valve at maximum pressure and a control valve for the pressure increasing means adapted to vary the maximum to correspond to load requirements, the first valve having means associated therewith for automatically closing the same when the pressure reaches a predetermined minimum.

16. In a fuel injector, a pressure chamber having a retractible delivery valve and an intake valve coacting with the rear end thereof, a pin extending through the intake valve and bearing on the delivery valve and having means urging the delivery valve into closed position, pressure responsive means urging the two valves together and means for operating the intake valve.

17. A nozzle for an engine of the character described, comprising a high-pressure chamber having communication with the engine, a low pressure chamber having communication with the high pressure chamber, a valve for the first communication, a valve for the second communication coacting with the first valve in forming a seal between the two chambers, pressure-responsive means tending to maintain the seal closed, spring means for seating the second valve, means for retracting the second valve and spring means for seating the first valve adapted to yield to a predetermined pressure in the high pressure chamber.

18. A chamber having an intake and a delivery valve, spring means for normally closing the delivery valve, means for alternately increasing and decreasing pressure in the chamber and means including a connection between the valves for causing the delivery valve to open when a predetermined degree of high pressure has been obtained while the intake valve remains closed, the spring means being arranged to close the delivery valve and to open the intake valve when the pressure drops due to the opening of the delivery valve.

19. In a fuel injector, a pressure chamber having a rear wall and a port leading to the engine, a valve for the port, a member seated against the rear end of the valve and pressure responsive means for locking the valve to the member for opening the valve when the member is retracted, said member having a portion extending through the rear wall of said pressure chamber of a cross-sectional area not greater than the cross-sectional area of that portion of the valve which is not exposed to fuel pressure in the closed position of the valve.

GUY A. BELL.